United States Patent
Parikh et al.

(10) Patent No.: US 8,856,145 B2
(45) Date of Patent: Oct. 7, 2014

(54) SYSTEM AND METHOD FOR DETERMINING CONCEPTS IN A CONTENT ITEM USING CONTEXT

(75) Inventors: Jignashu Parikh, Gujarat (IN); John Thrall, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1403 days.

(21) Appl. No.: 11/639,849

(22) Filed: Dec. 15, 2006

(65) Prior Publication Data

US 2008/0033982 A1    Feb. 7, 2008

(30) Foreign Application Priority Data

Aug. 4, 2006 (IN) .......................... 1396/CHE/2006

(51) Int. Cl.
*G06F 17/30* (2006.01)

(52) U.S. Cl.
CPC .... G06F 17/30613 (2013.01); G06F 17/30864 (2013.01)
USPC ............................ 707/750; 707/751; 707/768

(58) Field of Classification Search
USPC ........................ 707/705, 722, 723, 732, 733
See application file for complete search history.

(56) References Cited

U.S. PATENT DOCUMENTS

| | | | | |
|---|---|---|---|---|
| 5,418,951 A | * | 5/1995 | Damashek | 707/5 |
| 5,867,799 A | * | 2/1999 | Lang et al. | 707/1 |
| 6,675,159 B1 | * | 1/2004 | Lin et al. | 1/1 |
| 2003/0177112 A1 | * | 9/2003 | Gardner | 707/3 |
| 2003/0217052 A1 | * | 11/2003 | Rubenczyk et al. | 707/3 |
| 2004/0068697 A1 | * | 4/2004 | Harik et al. | 715/513 |
| 2005/0187923 A1 | * | 8/2005 | Cipollone | 707/3 |
| 2005/0210017 A1 | * | 9/2005 | Cucerzan | 707/3 |
| 2007/0073678 A1 | * | 3/2007 | Scott et al. | 707/5 |

* cited by examiner

*Primary Examiner* — Robert Beausoliel, Jr.
*Assistant Examiner* — Nirav K Khakhar
(74) *Attorney, Agent, or Firm* — Pillsbury Winthrop Shaw Pittman LLP

(57) ABSTRACT

The present invention is directed towards systems and methods for indexing one or more items of content. The method of the present invention comprises extracting one or more items of text from a given item of content. The one or more items of extracted text are tokenized into one or more concepts. One or more related concepts associated with the one or more concepts are identified. A support score is generated for the one or more concepts, and the item of content is index with the one or more concepts and the one or more associated support scores.

43 Claims, 5 Drawing Sheets

SYSTEM AND METHOD FOR DETERMINING CONCEPTS IN A CONTENT ITEM USING CONTEXT

CROSS-REFERENCE TO PRIORITY/PCT APPLICATIONS

This application claims priority under 35 U.S.C. § 119 of IN 1396/CHE/2006 filed Aug. 4, 2006, which is hereby expressly incorporated by reference in its entirety and each assigned to the assignee hereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally provides methods and systems for summarizing an item of content based upon terms associated with the item of content. More specifically, the present invention provides methods and systems to assign a known context around concepts, e.g., using query logs or corpus, which may be used to summarize one or more items of content and may be used to locate items of content responsive to a given search request

BACKGROUND OF THE INVENTION

The World Wide Web ("Web") provides a large collection of interlinked content items in various formats, including documents, images, video and other media content. As the Web has grown, the ability of users to search this collection and identify content items relevant or responsive to a given query has become increasingly difficult, with a number of search service providers existing to meet this need. In general, a search provider publishes a web page via which a user may submit a query indicating terms in which the user is expressing an interest. In response to the query, the search service generates and transmits to the user a list of links to Web pages or locations of content items that are relevant to the query, typically in the form of a search results page.

Existing query response methods generally involve the following steps. First, an index or database of word/location pairs is searched-using one or more search terms extracted from the query to generate a list of hits (usually target pages or sites, or references to target pages or sites, that contain the search terms or are otherwise identified as being relevant to the query). The hits are ranked according to ranking criteria, with better results (according to the criteria) given more prominent placement, e.g., towards the top of the list. The ranked list of hits is transmitted to the user, usually in the form of a results page containing a list of links to the hit pages or sites.

Ranking of hits is often an important factor in whether a user's search ends in success or frustration. Frequently, a query returns such a large number of hits that it is impossible for a user to explore all of the hits in a reasonable time. If the first few links a user follows fail to lead to relevant content, the user may often give up on the search and possibly on the search service provider, even though relevant content might have been available farther down the ranked list of hits.

To maximize the likelihood that relevant content is prominently placed, search service providers have attempted to develop ranking criteria and algorithms. Such ranking criteria may utilize the number of occurrences or the proximity of search terms on a given web page or document. Similarly, existing algorithms may examine the placement of search terms in a given web page or document for use in ranking content items in a result set. While existing algorithms may determine the frequency of search terms in a given document or the placement of search terms, these algorithms fail to take into account the context of the search terms in a given document.

In order to overcome shortcomings associated with existing techniques for identifying and ranking content items in response to a search query, embodiments of the present invention provide systems and methods for determining the context of one or more terms associated with an item of content to identify the most relevant items of content responsive to a given search query.

SUMMARY OF THE INVENTION

The present invention is directed towards methods and systems for indexing one or more items of content. The method of the present invention comprises extracting one or more items of text from a given item of content, wherein an item of content may comprise a web page, a document, a video file, or an audio file. The one or more items of extracted text may comprise one or more terms within an item of content or one or more items of metadata describing an item of content.

The extracted text is tokenized into one or more concepts, wherein a concept comprises one or more keywords or phrases. According to one embodiment of the invention, the frequency with which one or more keywords or phrases appear in a corpus of content items is identified. The extracted text is tokenized into the one or more keywords or phrases that appear with the greatest frequency in the corpus of content items. The frequency with which one or more keywords or phrases appear in a corpus of content items may be identified through use of ngram detection or units technology. Alternatively, or in conjunction with the foregoing, the frequency with which one or more keywords or phrases appear in a corpus of content items comprises identifying the frequency with which one or more keywords or phrases appear in one or more query logs.

One or more related concepts associated with the one or more concepts are identified. The one or more related concepts associated with the one or more concepts comprise keywords or phrases. According to one embodiment of the invention, the one or more related concepts are identified with reference to one or more query refinement keywords or phrases or one or more keywords or phrases submitted by a user during a query session. According to another embodiment of the invention, identifying one or more related concepts comprises identifying one or more frequently co-occurring keywords or phrases in a corpus of content items or one or more keywords or phrases associated with a given concept as specified by a human editor.

A support score is calculated for the one or more concepts. According to one embodiment of the invention, the frequency with which the one or more concepts appear in the item of content are identified. Additionally, the presence or absence of the one or more related concepts associated with the one or more concepts is determined. A support score for the one or more concepts is calculated based upon the frequency with which the one or more concepts appear in the item of content and the presence or absence of the one or more related concepts.

The item of content is indexed with the one or more concepts and the one or more associated support scores. According to one embodiment of the invention, the item of content is indexed with the one or more concepts with associated support scores exceeding a given support score threshold.

The method of the present invention further comprises receiving a search query comprising one or more terms. An index maintaining one or more items of content with associated concepts and support scores is accessed. One or more items of content with associated concepts responsive to the one or more terms comprising the search query are selected. The one or more selected items of content, sorted according to the support scores corresponding to the one or more concepts with which the one or more items of content are associated, are thereafter transmitted. According to one embodiment of the invention, the one or more selected items of content are transmitted to a client device.

The present invention is further directed towards a system for indexing one or more items of content. The system of the present invention comprises a text extractor operative to extract one or more items of text from an item of content, wherein an item of content may comprise a web page, a document, a video file, or an audio file. The text extracted by the text extractor may comprise one or more terms or one or more items of metadata associated with an item of content.

A concept dictionary maintains one or more concepts, wherein a concept comprises a keyword or a phrase. According to one embodiment of the invention, the one or more keywords or phrases maintained in the concept dictionary comprise frequently appearing keywords or phrases in a corpus of content items or query logs.

A context dictionary maintains one or more related concepts associated with the one or more concepts maintained in the concept dictionary, wherein a related concept comprises a keyword or a phrase. According to one embodiment of the invention, the context dictionary maintains one or more query refinement keywords or phrases associated with a given concept maintained in the concept dictionary. According to another embodiment of the invention, the context dictionary maintains one or more keywords or phrases submitted by a user during a query session. According to a further embodiment of the invention, the context dictionary maintains one or more frequently co-occurring keywords or phrases appearing in a corpus of content items. According to yet another embodiment of the invention, the context dictionary maintains one or more keywords or phrases associated with a given concept as specified by a human editor.

An aboutness extractor tokenizes the one or more items of text extracted from the item of content according to the one or more concepts maintained in the concept dictionary. The aboutness extractor identifies one or more related concepts associated with the one or more concepts in the item of content and generates support scores for the one or more concepts associated with the item of content.

According to one embodiment of the invention, the aboutness extractor identifies the frequency with which one or more concepts appear in the item of content and the presence or absence of the one or more related concepts associated with the one or more concepts in the item of content. The aboutness extractor generates a support score for the one or more concepts associated with the item of content through use of the frequency with which the one or more concepts appear in the item of content and the presence or absence of the one or more related concepts.

The aboutness extractor is further operative to index the item of content, the one or more concepts associated with the item of content, and the one or more corresponding support scores. According to one embodiment, the aboutness extractor indexes the one or more concepts associated with the item of content with support scores exceeding a given support score threshold.

The system of the present invention further comprises an other information data store operative to maintain information indicating the reliability of one or more items of content or one or more concepts maintained in the concept dictionary. The aboutness extractor is operative to generate a support score for the one or more concepts associated with an item of content using the information maintained in the other information data store.

The system of the present may further comprise a dictionary manager. According to one embodiment of the invention, the dictionary manager is operative to provide updated information associated with one or more concepts to the concept dictionary. According to another embodiment of the invention, the dictionary manager is operative to provide updated information associated with one or more related concepts to the context dictionary.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
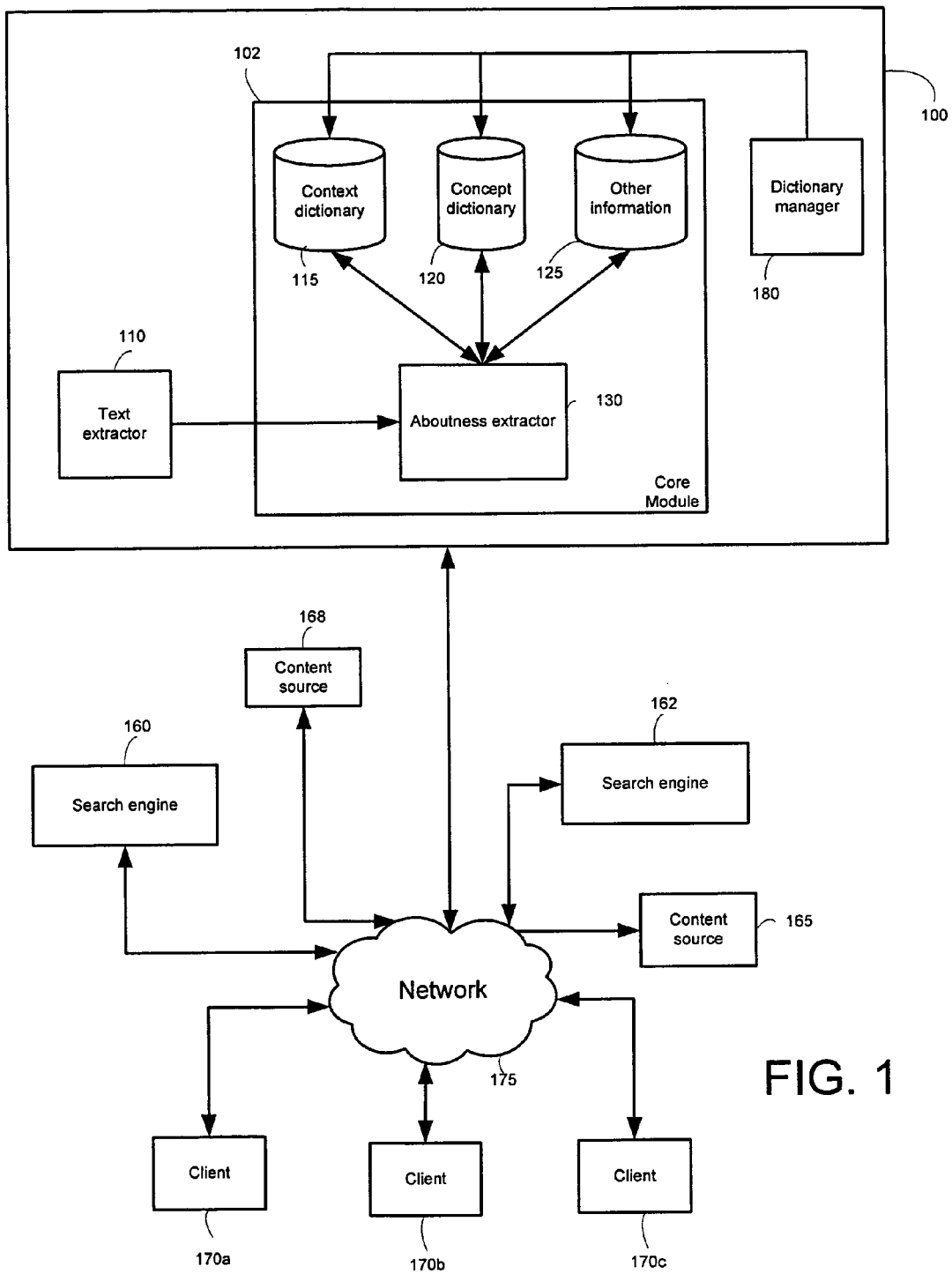
FIG. 1 is a block diagram illustrating a system for identifying one or more concepts associated with one or more items of content according to one embodiment of the present invention.

FIG. 1 presents a block diagram depicting one embodiment of a system for identifying one or more concepts associated with one or more items of content. According to the embodiment illustrated in FIG. 1, one or more search engines 160 and 162 are communicatively coupled to a network 175, which may include a connection to one or more local and/or wide area networks, such as the Internet. The search engines 160 and 162 may maintain one or more items of content in one or more content sources 165 and 168. For example, the one or more search engines 160 and 162 may maintain one or more indices or listings of documents, web pages, URLs, web pages, etc., in one or more content sources 165 and 168. Content sources 165 and 168 may be accessible memory structures such as a database, CD-ROM, tape, digital storage library, etc. Content sources 165 and 168 may be implemented as databases, file systems, or any other type of storage structures capable of providing for the retrieval and storage of a variety of data types. Content sources 165 and 168 may be communicatively coupled to a search engine 160 and 162 and/or or the network 175 for receiving requests for content and providing a variety of content items in response to such requests.

The one or more content items maintained by a search engine 160 and 162 in content sources 165 and 168 may be delivered to a text extractor 110 at a search provider 100. The text extractor 110 at the search provider 100 is operative to extract the text of a given content item (including metadata or other information related to the given content item) delivered by the search engine 160 and 162. The text extractor 110 is further operative to deliver the extracted text of a given content item to a core module 102. Alternatively, or in conjunction with foregoing, the text extractor 110 may identify and retrieve tags associated with a given item of content. According to one embodiment of the invention, the tags associated with a given item of content comprise user created metadata identifying or describing a given item of content. For example, the tags associated with a given content item may comprise one or more terms describing the content item. The text extractor 110 may deliver the tags retrieved from a given content item to the core module 102.

The core module 102 receives the text extracted by the text extractor 110 associated with a given item of content and utilizes an aboutness extractor 130 to tokenize the extracted text according to one or more keywords and/or phrases maintained in a concept dictionary 120. According to one embodiment, the one or more keywords and/or phrases maintained in the concept dictionary 120 comprise keywords and/or phrases frequently appearing in a corpus of content items. Using ngram detection or units technology, the frequency with which one or more keywords and/or phrases appear in a corpus of content items may be identified. For example, the concept dictionary 120 may maintain the one or more keywords and/or phrases that appear with the greatest frequency in a corpus of content items maintained in one or more content sources 165 and 168.

Alternatively, or in conjunction with the foregoing, the one or more keywords/phrases maintained in the concept dictionary 120 may be selected from query logs comprising the one or more queries submitted by users of client devices 170a, 170b, and 170c to one or more search engines 160 and 162. For example, the search provider 100 may monitor a plurality of search engines 160 and 162 and maintain logs identifying the various queries, comprising one or more keywords and/or phrases, that one or more users of client devices 170a, 170b, and 170c submit to one or more search engines 160 and 162. The concept dictionary 120 may be populated with the one or more keywords and/or phrases appearing with the greatest frequency in one or more query logs.

The aboutness extractor 130 is operative to tokenize the text extracted from a given item of content and identify the frequency with which the one or more keywords and/or phrases maintained in the concept dictionary 120 appear in the item of content. The one or more keywords and/or phrases maintained in the concept dictionary 120 that appear in a given item of content comprise "concepts." The one or more concepts appearing in a given item of content, and the frequency with which the one or more concepts appear in the item of content, are identified and maintained by the aboutness extractor 130.

The aboutness extractor 130 further identifies the frequency with which one or more concepts related to a given concept ("related concepts") appear in a given item of content. According to one embodiment of the invention, a context dictionary 115 maintains information identifying the one or more related concepts associated with a given concept maintained in the concept dictionary 120, wherein a related concept comprises one or more keywords and/or phrases associated with a given concept.

According to one embodiment of the invention, the context dictionary 115 maintains information identifying one or more keywords and/or phrases used to refine a query or search request. For example, a user of a client device 170a, 170b, and 170c may submit a query, comprising one or more keywords and/or phrases, to a search engine 160 and 162 and receive one or more results in response to the user's query. The user, however, may receive results that do not contain the information desired or the user may receive too many results. The user may therefore wish to supplement the query with refinement keywords and/or phrases to narrow the scope of the query. The one or more keywords and/or phrases used to refine the user's initial query may be delivered to the context dictionary 115, providing an indication of the one or more related concepts, comprising keywords and/or phrases, that may be associated with a given concept maintained in the concept dictionary 120.

Alternatively, or in conjunction with the foregoing, a units data store (not pictured) may be populated with information regarding the unit frequency and query frequency for an observed universe of search queries, which may also comprise categorization information for a given keyword and/or phrase. Accordingly, the context dictionary 115 may utilize information in the units data store to calculate the probability that one or more keywords and/or phrases are logically related as a unit, as well as a category for the logical unit. Additional information regarding units may be found in U.S. Pat. No. 7,051,023, entitled "SYSTEM AND METHOD FOR GENERATING CONCEPT UNITS FROM SEARCH QUERIES," filed Nov. 12, 2003 and assigned the disclosure of which is hereby incorporated by reference in its entirety.

According to another embodiment of the invention, the context dictionary 115 maintains information identifying the one or more queries submitted by a user during a given time period or query session. For example, one or more search engines 160 and 162 may receive a plurality of queries, comprising one or more keywords and/or phrases, during a given time period. The search provider 100 may monitor the one or more queries submitted by a user during a given time period to identify keywords and/or phrases that may be related and store the one or more related queries and keywords and/or phrases in the context dictionary 115. For example, a user of a search engine may submit a query comprising the term "Toyota." The user may obtain one or more results and thereafter submit a different query comprising the term "Honda," followed subsequently by a query comprising the term "Mitsubishi." Similarly, another user may submit a query comprised of the term "Mitsubishi" and obtain one or more results and thereafter submit an additional query comprised of the term "Toyota." The search provider 100 may monitor the one or more queries submitted by the users and determine that the terms "Honda," "Mitsubishi," and "Toyota" frequently appear in queries submitted by users during a given time period or query session. The queries and related keywords and/or phrases, as identified by the search provider 100, may be maintained in the context dictionary 115.

According to yet another embodiment of the invention, the context dictionary 115 maintains information identifying frequently co-occurring keywords and/or phrases in a corpus of content items. The search provider 100 may monitor the one or more items of content maintained by one or more search engines 160 and 162 in one or more content sources 165 and 168 to identify keywords and/or phrases that frequently co-occur in items of content. For example, the search provider 100 may examine a plurality of advertisements and web pages maintained in content sources 165 and 168 and determine that the keywords and/or phrase "interest rates" and "mortgage" frequently co-appear in advertisements and web pages. Similarly, the search provider 100 may determine that the keywords and/or phrase "patent" and "intellectual property" frequently co-appear in content items. The frequently co-appearing keywords and/or phrases may be maintained by the context dictionary 115 in an index or other structure capable of maintaining an indication of frequently co-appearing keywords and/or phrases.

According to a further embodiment of the invention, the index or other structure of co-appearing keywords and/or phrases maintained by the context dictionary 115 may be supplemented with information from a human editor identifying one or more keywords and/or phrases related to a given concept. According to one embodiment, an entry in the index supplemented by a human editor comprises a pair of one or more keywords and/or phrases that are related. For example, a human editor may submit an index entry pair comprising the phrase and keyword "notebook computer, laptop," indicating that the phrase "notebook computer" is associated with the keyword "laptop." Similarly, a human editor may submit an index entry pair comprising the keyword and phrase "Bluetooth, wireless technology," indicating that the phrase "wireless technology" is associated with the keyword "Bluetooth."

The aboutness extractor, 130 retrieves the one or more keywords and/or phrases from the context dictionary 115 that are associated with the one or more concepts identified in a given item of content. The one or more keywords and/or phrases retrieved from the context dictionary 115 comprise "related concepts" with respect to the one or more concepts identified in a given item of content.

The aboutness extractor 130 thereafter searches the item of content to determine the presence or absence of the one or more related concepts retrieved from the context dictionary 115. The one or more related concepts appearing in the item of content are identified and the aboutness extractor 130 maintains information indicating the presence or absence of the one or more related concepts.

The aboutness extractor 130 utilizes the frequency of the one or more concepts appearing in the item of content, as well as information indicating the presence or absence of the one or more related concepts associated with a given concept appearing in the item of content, to calculate a support score for the one or more concepts in the item of content. The aboutness extractor 130 may also utilize information maintained in an other information data store 125 to calculate a support score for a given concept. For example, the other information data store 125 may maintain human editorial information indicating one or more concepts that are unreliable. The aboutness extractor 130 may utilize the information maintained in the other information data store 125 to appropriately discount the support score for a given concept. Similarly, the other information data store 125 may maintain tags or metadata generated by users describing a given content item. The aboutness extractor 130 may utilize the user generated tags or metadata for a given item of content to further determine the support score for a given concept identified in the content item. For example, the aboutness extractor 130 may appropriately increase the support score for a concept that is similar or matches a user generated tag or item of metadata describing a given content item.

The search provider 100 thereafter generates a concept index with entries identifying the one or more concepts associated with an item of content, as well as the respective support scores of the one or more concepts. For example, the one or more web pages, documents, etc., maintained by a search engine 160 and 162 and delivered to the search provider 100 may be indexed in a concept index with the one or more concepts with which the web pages, documents, etc., are associated, as well as the support scores associated with the one or more concepts.

According to one embodiment, the search provider 100 generates an index for the one or more dominant concepts associated with the one or more content items received by a search engine 160 and 162. A dominant concept may comprise the N concepts associated with one or more items of content with the greatest associated support scores. Alternatively, or in conjunction with the foregoing, a dominant concept may comprise the one or more concepts associated with one or more items of content with support scores exceeding a given support score threshold. Those of skill in the art recognize the plurality of techniques that may be used to select one or more dominant concepts associated with one or more items of content using the support scores of the one or more concepts with which the one or more items of content are associated.

The concept index generated by the search provider 100 may be delivered to the respective search engine 160 and 162 from which the one or more content items were received. A user of a client device 170a, 170b, and 170c communicatively coupled to the network 175 may transmit a search query comprising one or more terms to a search engine 160 and 162. According to one embodiment of the invention, a client device 170a, 170b and 170c is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A typical query received from a user of a client device 170a, 170b, and 170c has one or more terms. For example, the query "wireless notebook computer" contains three terms and may be referred to as a three-term query. Similarly, queries containing only one term are referred to as one-term queries, queries containing two terms are two-term queries, etc. A space or other delimiter character may used to identify the individual terms comprising a given query.

A search engine 160 and 162 may utilize the one or more terms comprising a given query to identify one or more content items that are associated with one or more concepts that match or are similar to the one or more terms comprising the query. According to one embodiment of the invention, a search engine 160 and 162 traverses the abovementioned concept index to identify the one or more concepts that match or are similar to the one or more terms comprising a query received from a user of a client device 170a, 170b, and 170c. The one or more content items that are associated with the one or more concepts that match or are similar to the one or more terms comprising a query received from a user of a client device 170a, 170b, and 170c may be selected and added to a result set. The content items may thereafter be sorted in descending order according to the support scores for the one or more concepts with which the one or more content items are associated. The sorted result set may thereafter be transmitted to the user of the client device 170a, 170b, and 170c with which the query originated. A user may thereafter refine the original query submitted or submit a new query to obtain additional or different results.

According to the embodiment illustrated in FIG. 1, a dictionary manager 180 is used to provide periodic updates to the concept dictionary 120, context dictionary 115 and the other information 125 data store at the search provider 100. For example, when a user of a client device 170a, 170b and 170c refines a query, the query refinement may be propagated to the concept dictionary 120. Similarly, if content sources 165 and 168 are updated with additional items of content, the updates may be propagated to the context dictionary 115 to ensure the context dictionary 115 maintains the most relevant information on keywords and/or phrases associated with one or more concepts. Further, if a user submits a query to one or more search engines 160 and 162, the dictionary manager 180 may update the concept dictionary 120 query logs to reflect the user's query.

Figure 2:
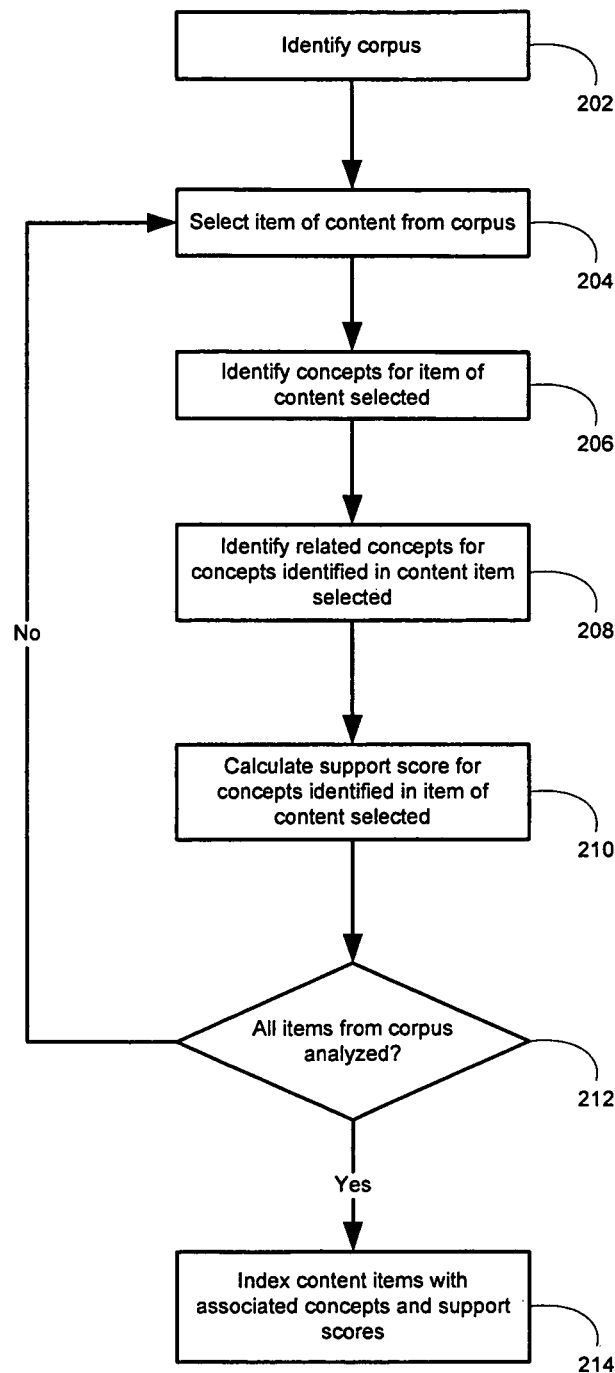
FIG. 2 is a flow diagram illustrating a method for identifying one or more concepts associated with one or more items of content according to one embodiment of the present invention.

FIG. 2 is a flow diagram illustrating one embodiment of a method for identifying one or more concepts associated with one or more items of content. According to the embodiment illustrated in FIG. 2, a corpus of content items is identified, step 202. The one or more content items may comprise documents, web pages, blogs, advertisements, etc., and may be maintained by a search engine or other provider of content. For example, the one or more content items may comprise web pages and advertisements maintained by a search engine such as Yahoo! in one or more data stores, such as a database, CD-ROM, tape, digital storage library, etc.

A given item of content is selected from among the one or more content items comprising the corpus, step 204. The one or more concepts associated with the item of content selected are identified, wherein a concept comprises a keyword or a phrase, step 206. According to one embodiment of the invention, the one or more concepts associated with the item of content are identified with reference to a concept dictionary maintaining one or more concepts. The concept dictionary used to identify the one or more concepts in a given item of content may be populated using ngram detection or units technology applied on one or more query logs or a corpus of content items.

One or more related concepts associated with the one or more concepts identified in the content item selected are identified, wherein a related concept comprises a keyword or phrase associated with a given concept, step 208. According to one embodiment of the invention, the one or more related concepts associated with a concept are maintained in a context dictionary. The context dictionary may be generated using a plurality of techniques for identifying one or more keywords or phrases that are associated with one or more concepts. For example, a context dictionary maintaining keywords or phrases that are related to one or more concepts may be generated using information derived from user query sessions. A user may submit a plurality of queries comprising one or more terms during a given time period or during a given search session. The one or terms comprising the one or more queries submitted by a user during a given time period or search session may relate to a similar topic or category. The one or more terms comprising the one or more queries may be retrieved and used to identify one or more terms associated with a concept retrieved from a given item of content.

Alternatively, or in conjunction with the foregoing, a context dictionary may be generated using information received from one or more human editors identifying one or more keywords or phrases associated with one or more concepts. The context dictionary may maintain the one or more keywords or phrases associated with a concept as identified by one or more human editors in an index or similar structure.

A support score is thereafter calculated for the one or more concepts identified in the item of content selected according to methods described herein, step 210. The support score for a given concept provides a numerical indication of the relevancy of a given content item with respect to the concept, as well as the one or more related concepts associated with the given concept.

A check is thereafter performed to determine whether the one or more content items comprising the corpus of content items have been analyzed, step 212. If one or more additional content items require analysis, a next content item is selected from among the corpus, step 204. After the one or more content items comprising the corpus have been analyzed, the one or more content items comprising the corpus, the one or more concepts associated with the one or more content items, and the support scores corresponding to the concepts are indexed, step 214. For example, an index may be generated wherein a given index entry comprises a content item, the one or more concepts associated with the content item, and the respective support scores of the one or more concepts. The index generated may be used to locate items of content responsive to search requests, such as user search queries, according to methods further described herein.

Figure 3:
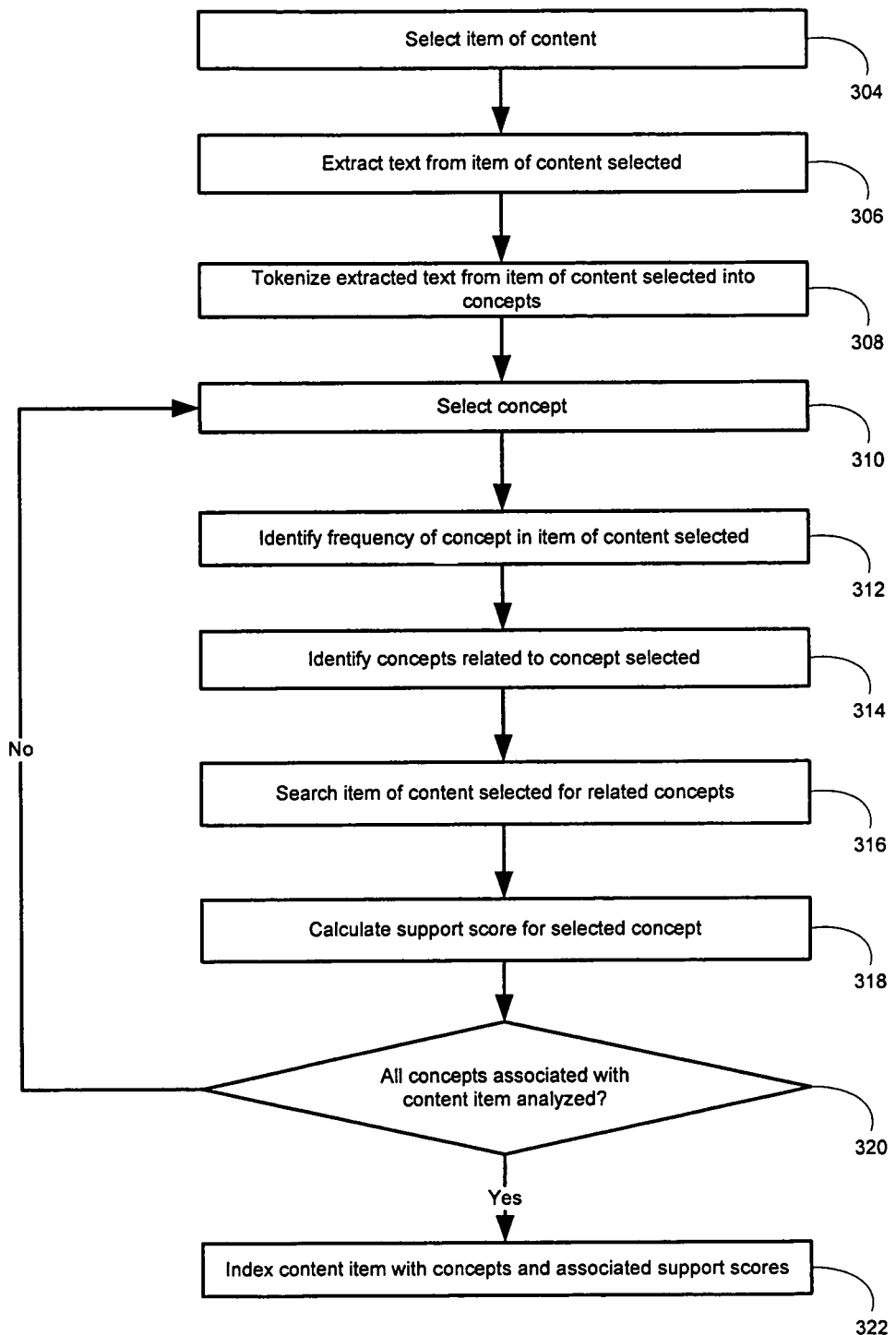
FIG. 3 is a flow diagram illustrating a method for calculating a support score for one or more concepts associated with an item of content according to one embodiment of the present invention.

FIG. 3 is a flow diagram illustrating one embodiment of a method for calculating a support score for the one or more concepts associated with a given item of content. A given item of content is selected, step 304, and the text from the item of content selected is extracted, step 306. For example, a given item of content may comprise a web page, a document, a blog, etc., comprising one or more images, video files, audio files, and text. The text within the web page, document, or blog may be extracted. Alternatively, or in conjunction with the foregoing, one or more tags associated with a given item of content may be extracted. For example, a given item of content may be associated with user created metadata describing the item of content. The one or more items of metadata associated with an item of content may be extracted.

The text extracted from the selected item of content is tokenized into one or more concepts, wherein a concept comprises one or m ore keywords or phrases, step 308. According to one embodiment of the invention, a concept within a given item of content is identified with reference to a concept dictionary. As previously described, the one or more concepts, comprising keywords or phrases, maintained in a concept dictionary may comprise keywords or phrases frequently appearing in a corpus of content items. For example, through use of ngram detection or units technology, the frequency with which one or more keywords or phrases appear in a corpus of content items may be identified and used to populate a concept dictionary. Similarly, the one or more keywords or phrases maintained in a concept dictionary may comprise keywords or phrases that frequently appear in one or more query logs.

The tokenization performed in step 308 results in the identification of the one or more concepts associated with the item of content selected. A given concept is selected from the one or more concepts associated with the selected item of content, step 310. The frequency with which the selected concept appears in the item of content selected is thereafter identified, step 312. For example, a concept associated with an item of content may comprise the phrase "wireless laptop." The frequency with which the concept "wireless laptop" appears in the item of content selected may be identified.

The one or more related concepts associated with the concept selected are thereafter identified, step 314. According to one embodiment of the invention, the one or more related concepts associated with a given concept are maintained in a context dictionary. A context dictionary may comprise an index or similar structure maintaining one or more entries identifying the one or more concepts with which a given concept is related.

According to one embodiment of the invention, a related concept comprises a keyword or phrase with which a given concept is related. For example, as previously described, a concept may comprise the phrase "wireless laptop." A concept related to the concept "wireless laptop" may comprise the keyword "computer," as well as the keyword "notebook." The keywords "computer" and "notebook" thus comprise related concepts with respect to the concept "wireless laptop."

A search is thereafter performed to determine the presence or absence of the one or more related concepts associated with the concept selected, step 316. The frequency of the selected concept in the item of content selected, as well as the information indicating the presence or absence of the one or more related concepts associated with the concept selected are used to calculate a support score for the selected concept, step 318.

According to one embodiment of the invention, a support score is calculated using a combination of concept frequency, a Term Frequency/Inverse Document Frequency ("TF/IDF") measure using the one or more terms comprising a concept, and query log history. Table A illustrates one embodiment of a method for combining the term frequency, query log history and TFIDF score to calculate a support score for a given concept.

TABLE A $$\text{support score}(k) = w1 * (\log(1 + (1000 * (\text{doc\_freq}(k) - 1))) * \text{query\_freq}(k) * \text{query\_unit\_ratio}(k)) + w2 * \left( \frac{\sum_{k_j \neq k \cap k_j = c_j} S_j}{\sum_{p=1...t} S_p} \right)$$

According to the equation presented in Table A, doc_freq(k) is the frequency of the concept k in a given item of content, query_feq(k) is the frequency of the concept k in one or more historical query logs, and query_unit_ratio(k) is the TFIDF measure of concept k based upon the query logs. w1 and w2 comprise weights that may be set to place greater weight on the frequency of a concept in a given item of content (weight w1) or to place greater weight on the frequency of the co-occurrences of one or more concepts matched in a context dictionary and item of content for a given concept divided by the total frequency of co-occurrence for possible co-occurrences listed in the context dictionary for the given concept.

A check is thereafter performed to determine whether a support score has been calculated for the one or more concepts associated with the item of content selected, step 320. If a support score has not been calculated for one or more concepts associated with the item of content selected, processing returns to step 310, where a subsequent concept is selected. When all concepts associated with the item of content selected have been analyzed, the content item selected, the one or more concepts associated with the content item selected, and the support scores corresponding to the one or more concepts are indexed in a concept index, step 322.

According to one embodiment of the invention, the content item selected is indexed in a concept index maintaining entries identifying the one or more dominant concepts associated with the item of content selected. A dominant concept may comprise a concept with a support score exceeding a given support score threshold. Alternatively, or in conjunction with the foregoing, the one or more dominant concepts associated with an item of content may comprise the N concepts with the greatest associated support scores.

The method illustrated in FIG. 3 and described above may be repeated for one or more content items comprising a corpus of content items. For example, the method illustrated in FIG. 3 may be repeated for the one or more web pages, documents, blogs, advertisements, etc., maintained by one or more search engines or similar content providers. Additionally, the abovementioned concept index may maintain index entries for the one or more content items comprising a corpus of content items identifying the one or more concepts with which the one or more content items are associated, as well as the scores corresponding to the one or more concepts.

Figure 4:
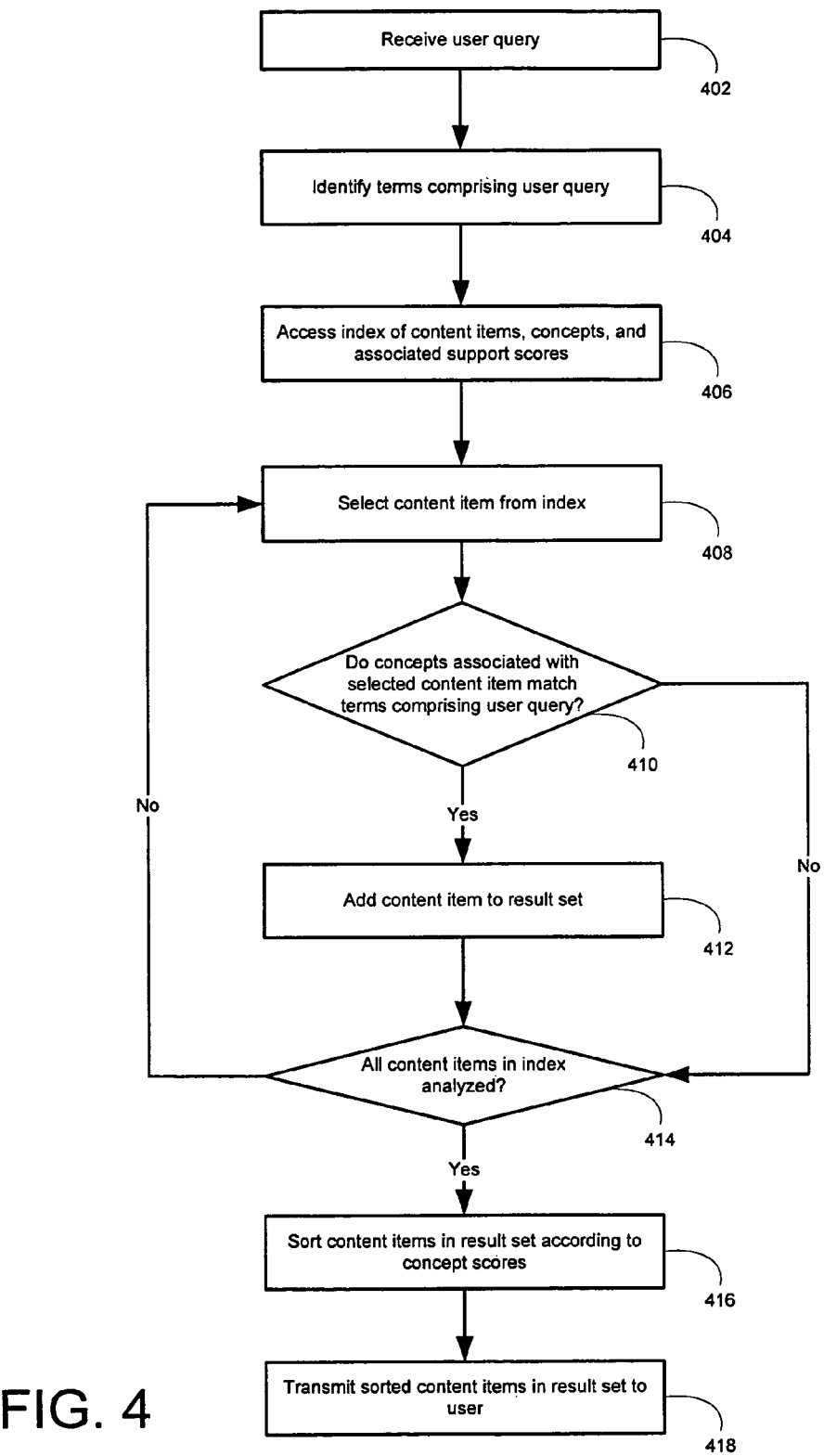
FIG. 4 is a flow diagram illustrating a method for selecting one or more items of content responsive to a search query using one or more concepts associated with an item of content according to one embodiment of the present invention.

A search engine may utilize the systems and methods of the present invention to provide a querying client with relevant content items using the one or more concepts associated with the one or more items of content maintained in a concept index. FIG. 4 illustrates one embodiment of a method for selecting one or more items of content in response to a search query through use of the one or more concepts associated with a given item of content. According to the embodiment illustrated in FIG. 4, a user query is received, step 402. For example, a user of a client device may submit a search query comprising one or more terms to a search engine. The user query is thereafter parsed in order to identify the one or more terms comprising the query, step 404. A concept index maintaining one or more content items, the one or more concepts associated with the one or more content items, and the support scores corresponding to the one or more concepts is accessed, step 406.

A given content item is selected from among the one or more content items in the concept index, step 408. A check is performed to determine whether the one or more concepts associated with the content item selected matches or is similar to the one or more terms comprising the query received, step 410. For example, a query received from a given user may comprise the terms "desktop computers." As previously described, a concept comprises one or more keywords or phrases. A concept associated with an item of content selected from the concept index may comprise the phrase "wireless desktop computer," constituting a match with respect to the abovementioned query "desktop computers."

If the one or more concepts associated with the item of content selected from the concept index match or are similar to the one or more terms comprising the query, the content item and the one or more concepts matching or similar to the query, as well as the support scores associated with the one or more matching or similar concepts, are added to a result set, step 412. If none of the one or more concepts associated with the item of content selected from the concept index match or are similar to the one or more terms comprising the query, or after an item of content has been added to the result set, a further check is performed to determine whether the one or more content items in the concept index have been analyzed with respect to the query received, step 414. If additional content items in the concept index require analysis, a subsequent content item is selected from the concept index, step 408.

After the one or more content items in the concept index have been analyzed, the one or more content items in the result set are sorted in descending order according to the support scores corresponding to the one or more concepts with which a given content item is associated, step 416. For example, the result set may comprise a web page content item and a document content item. The concepts associated with the web page content item matching the received user query may comprise the keywords "laptop" and "wireless," and may have corresponding support scores of twenty ("20") and thirty ("30"), respectively. The concepts associated with the document content item matching the received user query may comprise the phrases "desktop computer" and "wireless desktop computer," and may have corresponding support scores of ten ("10") and thirty-five ("35"), respectively.

According to one embodiment of the invention, the content item associated with the concept with the greatest corresponding support score is placed first in a sorted resulted set. Therefore, with reference to the abovementioned example, the document content item associated with the concept "wireless desktop computer" with a support score of thirty-five ("35") would be placed first in a sorted result set. According to another embodiment of the invention, the sum of the support scores of the one or more concepts associated with an item of content are used to sort the one or more content items in a result set. For example, the sum of the support scores of the abovementioned concepts "laptop" and "wireless" associated with the webpage content item yields the value fifty ("50"), whereas the sum of the support scores of the abovementioned concepts "desktop computer" and "wireless desktop computer" yields the value forty-five ("45"). Therefore, the web page content item, associated with a greater support score sum, may be ranked first in a sorted result set. Those of skill in the art recognize the plurality of techniques that may be used to sort the one or more content items comprising a result set using the one or more concepts and corresponding support scores with which the one or more content items are associated.

The one or more content items, sorted in descending order according to support scores are thereafter transmitted to the user with which the query originated, step 418. A user may review the one or more content items or generate a new query to retrieve additional or alternative content items.

Figure 5:
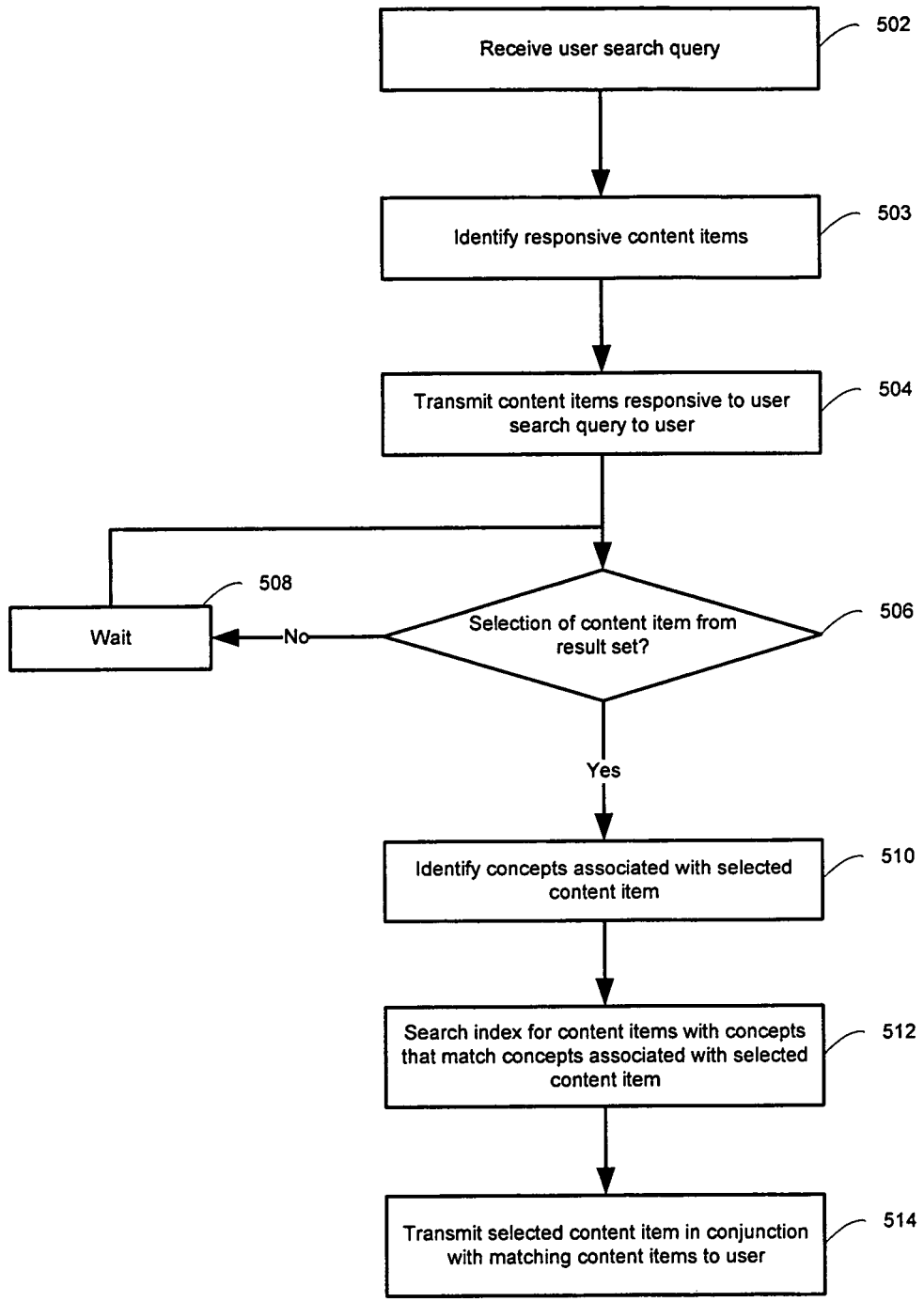
FIG. 5 is a flow diagram illustrating a method for identifying one or more items of content related to a given item of content according to one embodiment of the present invention.

In addition to search, the system and methods of the present invention may be utilized to provide integration of related content items. FIG. 5 presents one embodiment of a flow diagram illustrating a method for integrating related content items using the one or more concepts associated with a content item. According to the embodiment illustrated in FIG. 5, a search query comprising one or more terms is received from a user of a client device, step 502. The one or more terms comprising the search query are used to identify one or more responsive content items according to methods described herein, step 503. For example, as previously described, the system and methods of the present invention may be used to generate a concept index with entries identifying the one or more concepts associated with one or more items of content. The one or more terms comprising the search query may be used to identify one or more content items with concepts, comprising keywords or phrases, which match or are similar to the one or more terms comprising the user search query.

The one or more content items identified as responsive to the user search query are thereafter transmitted to the user with which the query originated, step 504. According to one embodiment of the invention, the one or more content items identified as responsive to the user search query are sorted in descending order according to the support scores of the one or more concepts associated with the one or more content items. A check is performed to determine whether the user has selected a content item from the one or more content items transmitted to the user, step 506. If the user does not make a selection, step 506, a wait state is entered until the user selects one or more of the content items identified as responsive to the user's search query, step 508.

Upon selection of a content item, step 506, the one or more concepts with which the selected content item is associated are identified, step 510. A search is thereafter performed to identify the one or more content items in the concept index that are associated with the one or more concepts with which the selected content item is associated, step 512. For example, a user of a client device may select a reference to a document content item associated with concepts A, B, and C. Upon selection of the reference to the document content item, a search may be performed to identify the one or more content items in the concept index that are associated with concepts A, B, or C.

The selected content item is then transmitted to the client from which the user search query was received in conjunction with the one or more content items identified as associated with the one or more concepts with which the selected content item is associated. The user is thus presented with the content item selected, as well as the one or more content items, or portions of the one or more content items, which are related to the selected content item.

FIGS. 1-5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method implemented on at least one machine having at least one processor, storage, and a communication platform connected to a network for indexing one or more items of content, the method comprising:

extracting, by the at least one processor, one or more items of text from a given item of content;

tokenizing, by the at least one processor, the one or more extracted items of text into one or more concepts based on past queries submitted by one or more users;

identifying one or more related concepts associated with the one or more concepts;

obtaining, by the at least one processor, a support score for the individual one or more concepts based on whether one or more of the one or more concepts appear in the given item of content and/or whether one or more of the one or more related concepts appear in the given item of content; and generating an index, the index comprising the given item of content associated with the one or more concepts and corresponding support scores for the individual one or more concepts;

receiving a search query;

identifying, based on the index, a set of items of content responsive to the search query, wherein individual items of content in the set are indexed with one or more concepts that are related to the search query;

obtaining, for each individual item of content in the set, a sum of support scores associated with the one or more concepts that are related to the search query; and providing the set, wherein the items of content in the set are sorted based on the sum of support scores.

2. The method of claim 1, wherein an item of content comprises a web page.

3. The method of claim 1, wherein an item of content comprises a document.

4. The method of claim 1, wherein an item of content comprises a video file.

5. The method of claim 1, wherein an item of content comprises an audio file.

6. The method of claim 1, wherein extracting one or more items of text comprises extracting one or more terms from the given item of content.

7. The method of claim 1, wherein extracting one or more items of text comprises extracting one or more items of metadata describing the given item of content.

8. The method of claim 1, wherein tokenizing the one or more items of text into one or more concepts comprises tokenizing the one or more items of text into one or more keywords or phrases.

9. The method of claim 8, wherein tokenizing the one or more items of text into one or more keywords or phrases comprises:

identifying a frequency with which one or more keywords or phrases appear in a corpus of content items; and tokenizing the one or more items of extracted text into the one or more keywords or phrases that appear with the greatest frequency in the corpus of content items.

10. The method of claim 9, wherein identifying the frequency with which one or more keywords or phrases appear in the corpus of content items comprises identifying a frequency with which one or more keywords or phrases appear in the corpus of content items through use of ngram detection.

11. The method of claim 9, wherein identifying the frequency with which one or more keywords or phrases appear in the corpus of content items comprises identifying a frequency with which one or more keywords or phrases appear in the corpus of content items as logically related units.

12. The method of claim 9, wherein identifying the frequency with which one or more keywords or phrases appear in the corpus of content items comprises identifying a frequency with which one or more keywords or phrases appear in one or more query logs.

13. The method of claim 1, wherein identifying one or more related concepts associated with the one or more concepts comprises identifying one or more keywords or phrases associated with the one or more concepts.

14. The method of claim 13, wherein identifying one or more related concepts comprises identifying one or more query refinement keywords or phrases associated with a given concept.

15. The method of claim 13, wherein identifying one or more related concepts comprises identifying one or more keywords or phrases submitted by a user during a query session.

16. The method of claim 13, wherein identifying one or more related concepts comprises identifying one or more frequently co-occurring keywords or phrases in a corpus of content items.

17. The method of claim 13, wherein identifying one or more related concepts comprises identifying one or more keywords or phrases associated with a given concept as specified by a human editor.

18. The method of claim 1, wherein obtaining a support score for the individual one or more concepts comprises:
identifying a frequency with which the one or more concepts appear in the item of content.

19. The method of claim 1, the method further comprising:
identifying one or more dominant concepts from the one or more concepts, wherein the one or more dominant concepts have corresponding support scores exceeding a support score threshold; and
wherein the index comprises the given item of content associated with the one or more dominant concepts and the corresponding support scores.

20. The method of claim 1, wherein providing the set comprises transmitting the set to a client device.

21. A system comprising a processor coupled to a memory for indexing one or more items of content, the system comprising:
a text extractor operative to extract one or more items of text from an item of content;
a concept dictionary operative to maintain concepts;
a context dictionary operative to maintain related concepts associated with the concepts maintained in the concept dictionary; and
an aboutness extractor operative to:
tokenize the one or more extracted items of text into one or more concepts maintained in the concept dictionary based on past queries submitted by one or more users;
identify one or more related concepts associated with the one or more concepts in the item of content based on the context dictionary;
obtain a support score for the individual one or more concepts based on whether one or more of the one or more concepts appear in the item of content and/or whether one or more of the one or more related concepts appear in the item of content;
generate an index, the index comprising the item of content associated with the one or more concepts and corresponding support scores for the individual one or more concepts;
receive a search query;
identify, based on the index, a set of items of content responsive to the search query, wherein individual items of content in the set are indexed with one or more concepts that are related to the search query;
obtain, for each individual item of content in the set, a sum of support scores associated with the one or more concepts that are related to the search query; and
provide the set, wherein the items of content in the set are sorted based on the sum of support scores.

22. The system of claim 21, wherein an item of content comprises a web page.

23. The system of claim 21, wherein an item of content comprises a document.

24. The system of claim 21, wherein an item of content comprises a video file.

25. The system of claim 21, wherein an item of content comprises an audio file.

26. The system of claim 21, wherein the text extractor is operative to extract one or more terms included in the item of content.

27. The system of claim 21, wherein the text extractor is operative to extract one or more items of metadata associated with the item of content.

28. The system of claim 21, wherein the concept dictionary is operative to maintain the concepts comprising keywords or phrases.

29. The system of claim 28, wherein the concept dictionary is operative to maintain one or more keywords or phrases frequently appearing in a corpus of content items.

30. The system of claim 28, wherein the concept dictionary is operative to maintain one or more keywords or phrases frequently appearing in one or more query logs.

31. The system of claim 21, wherein the context dictionary is operative to maintain the related concepts comprising keywords or phrases associated with the concepts maintained in the concept dictionary.

32. The system of claim 31, wherein the context dictionary is operative to maintain one or more query refinement keywords or phrases associated with a given concept maintained in the concept dictionary.

33. The system of claim 31, wherein the context dictionary is operative to maintain one or more keywords or phrases submitted by a user during a query session.

34. The system of claim 31, wherein the context dictionary is operative to maintain one or more frequently co-occurring keywords or phrases appearing in a corpus of content items.

35. The system of claim 31, wherein the context dictionary is operative to maintain one or more keywords or phrases associated with a given concept as specified by a human editor.

36. The system of claim 21, wherein the aboutness extractor is operative to:
identify one or more dominant concept from the one or more concepts, wherein the one or more dominant concepts have corresponding support scores exceeding a support score threshold; and
wherein the index comprises the item of content associated with the one or more dominant concepts and the corresponding support scores.

37. The system of clam 21, comprising a data store.

38. The system of claim 37, wherein the data store is operative to maintain information indicating the reliability of one or more items of content.

39. The system of claim 37, wherein the data store is operative to maintain information indicating the reliability of one or more concepts maintained in the concept dictionary.

40. The system of claim 37, wherein the aboutness extractor is operative to obtain the support score using the information maintained in the data store.

41. The system of claim 21, comprising a dictionary manager.

42. The system of claim 41, wherein the dictionary manager is operative to provide updated information associated with at least one of the concepts to the concept dictionary.

43. The system of claim 41, wherein the dictionary manager is operative to provide updated information associated with at least one of the related concepts to the context dictionary.

* * * * *